C. N. WINTER.
ADJUSTABLE LINK.
APPLICATION FILED AUG. 27, 1912.
1,129,153.
Patented Feb. 23, 1915.
Fig. 1.
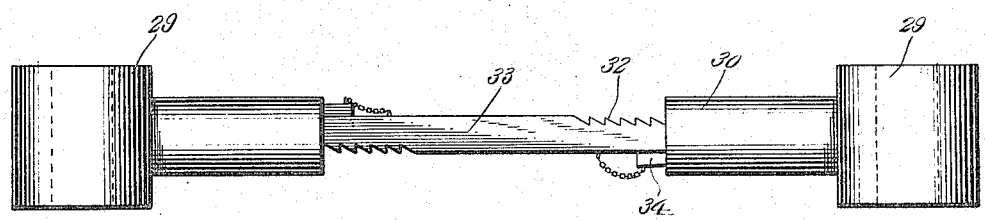
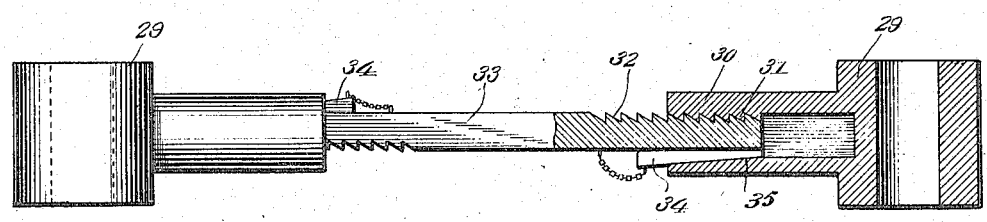
Fig. 2.
Inventor
C. N. Winter
By Victor J. Evans
Attorney
Witnesses
J. H. Crawford

UNITED STATES PATENT OFFICE.

CHARLES N. WINTER, OF MAHWAH, NEW JERSEY.

ADJUSTABLE LINK.

1,129,153. Specification of Letters Patent. Patented Feb. 23, 1915.

Application filed August 27, 1912. Serial No. 717,356.

*To all whom it may concern:*

Be it known that I, CHARLES N. WINTER, a citizen of the United States, residing at Mahwah, in the county of Bergen and State of New Jersey, have invented new and useful Improvements in Adjustable Links, of which the following is a specification.

The invention relates to hangers, and more particularly to the class of adjustable links adapted for use in sustaining brake shoes, pipes, shafts, or other parts.

The primary object of the invention is the provision of an adjustable link wherein the same can be readily and easily lengthened or shortened so that when the same is used with a brake shoe the latter can be properly adjusted to bring the said shoe to the desired angle with relation to the wheel.

Another object of the invention is the provision of an adjustable link of this character wherein the same is so connected as to make it impossible for the parts thereof to slip thereby assuring fast adjustment thereof when sustaining a brake shoe or other part.

A further object of the invention is the provision of an adjustable link of this character which is simple in construction, strong, durable, readily and easily adjusted, and also one which may be manufactured at a minimum cost.

With these and other objects in view the invention consists in the construction, combination and arrangement of parts as will be hereinafter more fully described, illustrated in the accompanying drawings, and pointed out in the claim hereunto appended.

In the drawings: Figure 1 is a top plan view of an adjustable link constructed in accordance with the invention. Fig. 2 is a fragmentary longitudinal sectional view therethrough.

Similar reference characters indicate corresponding parts throughout the several views in the drawings.

Referring to the drawings by numerals the adjustable link comprises a pair of terminal eyes 29, each being formed with a socket extension 30 at right angles thereto, the inner wall of each at one point thereof being provided with rack teeth 31 for locking engagement with rack teeth 32 formed on an adjustable connecting bar 33, it being understood of course that both ends of the bar are provided with rack teeth and after each end has been engaged in the socketed extension there is driven within the latter at one side of the bar a wedge key 34, the latter being fastened to the bar in any suitable manner. Thus it will be seen that when the key 34 is driven into the extension 30, the rack teeth 32 of the bar 33 will positively engage with the rack teeth 31, within the said extension of the terminal eye. It will be evident that the adjustable link can be readily lengthened and shortened as may be required. The inner wall of each socket extension 30 at one point thereof is provided with an outwardly inclined groove 35 forming a guide-way for the wedge key 34 which is driven in the groove 35 so as to slide against one face of the connecting bar 33 and thereby positively and firmly locking the said connecting bar in the socket extension 30 so as avoid any possibility of slight play or displacement of the connecting bar 33 with respect to the terminal pieces, yet the wedge 34 can be removed at will to permit the lengthening or shortening of the adjustable link as the occasion may require.

From the foregoing description, taken in connection with the accompanying drawings, it is thought that the construction and operation of the invention will be clearly understood, and therefore a more extended explanation has been omitted.

What is claimed is:—

The combination with a pair of eye members having tubular extensions, of rack teeth formed interiorly of the tubular extensions, a rack bar inserted in the tubular extensions and having its teeth engaging the teeth interiorly thereof, the said tubular extensions being formed with outwardly beveled guideways, and wedging keys inserted in the guideways and working against the rack bar for bringing its teeth in locking engagement with the teeth in the extensions, the said keys being of greater length than the guideways.

In testimony whereof I affix my signature in presence of two witnesses.

CHARLES N. WINTER.

Witnesses:
CHESTER D. JONES,
WALTER D. FINCH.